United States Patent
Beckman et al.

(10) Patent No.: US 9,908,619 B1
(45) Date of Patent: Mar. 6, 2018

(54) BALLAST CONTROL MECHANISMS FOR AERIAL VEHICLES

(71) Applicant: Amazon Technologies, Inc., Seattle, WA (US)

(72) Inventors: Brian C. Beckman, Newcastle, WA (US); Gur Kimchi, Bellevue, WA (US); Amir Navot, Seattle, WA (US); Daniel Buchmueller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 879 days.

(21) Appl. No.: 14/497,136

(22) Filed: Sep. 25, 2014

(51) Int. Cl.
*B64C 17/08* (2006.01)
*B64C 39/02* (2006.01)

(52) U.S. Cl.
CPC ............ *B64C 17/08* (2013.01); *B64C 39/024* (2013.01)

(58) Field of Classification Search
CPC ......... B64C 17/00; B64C 17/02; B64C 17/08; B64C 39/024; B64B 1/38; B64B 1/70
See application file for complete search history.

(56) References Cited

U.S. PATENT DOCUMENTS

| | | | | |
|---|---|---|---|---|
| 1,081,558 A | * | 12/1913 | Shouler | B64C 17/00 244/92 |
| 1,853,233 A | * | 4/1932 | Schwarz | B64C 1/00 244/93 |
| 3,229,934 A | * | 1/1966 | Vogtle | B64C 17/00 244/80 |
| 3,971,533 A | * | 7/1976 | Slater | B64B 1/38 244/30 |
| 3,985,320 A | * | 10/1976 | Brady | B64C 17/06 114/124 |
| 5,597,141 A | * | 1/1997 | Storaasli | B64G 1/22 244/164 |
| 6,196,066 B1 | * | 3/2001 | Barbier | B64C 27/008 73/456 |
| 6,685,137 B2 | * | 2/2004 | Darbyshire | G05D 1/0808 244/80 |
| 7,185,848 B2 | * | 3/2007 | Heaven, Jr. | B64B 1/70 244/93 |
| 8,648,509 B2 | * | 2/2014 | Bastian, II | B64C 27/20 244/23 |
| 9,415,870 B1 | * | 8/2016 | Beckman | B64C 39/024 |
| 9,422,055 B1 | * | 8/2016 | Beckman | B64C 39/024 |

(Continued)

*Primary Examiner* — Tien Q Dinh
*Assistant Examiner* — Michael A. Fabula
(74) *Attorney, Agent, or Firm* — Lee & Hayes, PLLC

(57) ABSTRACT

An automated aerial vehicle ("AAV") and systems, devices, and techniques pertaining to moveable ballast that is moveable onboard the AAV during operation and/or flight. The AAV may include a frame or support structure that includes the movable ballast. A ballast controller may be used to cause movement of the ballast based on one or more factors, such as a type of flight, a type of operation of the AAV, a speed of the AAV, a triggering event, and/or other factors. The ballast may be moved using mechanical, electrical, electromagnetic, pneumatic, hydraulic and/or other devices/techniques described herein. In some embodiments, the ballast may be moved or located in or toward a centralized position in the AAV to enable more agile control of the AAV. The ballast may be moved outward from the centralized location of the AAV to enable more stable control of the AAV.

20 Claims, 12 Drawing Sheets

(56) References Cited

U.S. PATENT DOCUMENTS

| | | | | |
|---|---|---|---|---|
| 9,469,394 | B2* | 10/2016 | Vaughn | A63H 27/12 |
| 9,550,561 | B1* | 1/2017 | Beckman | B64C 17/00 |
| 2001/0028018 | A1* | 10/2001 | Darbyshire | G05D 1/0808 |
| | | | | 244/93 |
| 2002/0175243 | A1* | 11/2002 | Black | B64B 1/02 |
| | | | | 244/97 |
| 2014/0263827 | A1* | 9/2014 | Smith | B64B 1/22 |
| | | | | 244/96 |
| 2016/0159471 | A1* | 6/2016 | Chan | B64C 39/024 |
| | | | | 244/39 |
| 2016/0159472 | A1* | 6/2016 | Chan | B64C 27/08 |
| | | | | 244/39 |
| 2016/0196755 | A1* | 7/2016 | Navot | G05D 1/0676 |
| | | | | 701/4 |
| 2016/0244157 | A1* | 8/2016 | Welsh | B64C 11/46 |
| 2016/0264234 | A1* | 9/2016 | Vaughn | A63H 27/12 |
| 2016/0340028 | A1* | 11/2016 | Datta | B64C 39/024 |
| 2016/0376014 | A1* | 12/2016 | Alnafisah | B64C 39/024 |
| | | | | 244/39 |
| 2017/0021915 | A1* | 1/2017 | Vaughn | A63H 27/12 |

* cited by examiner

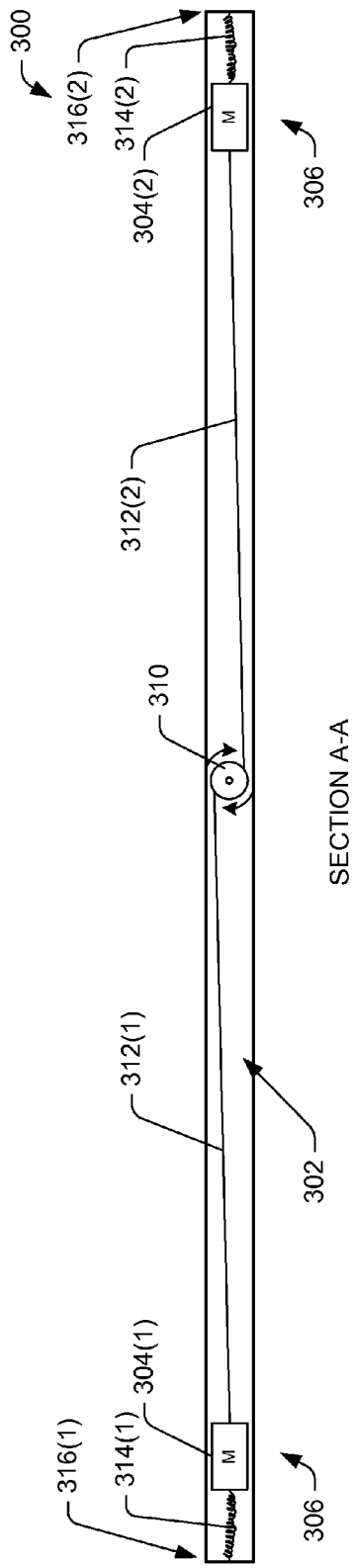
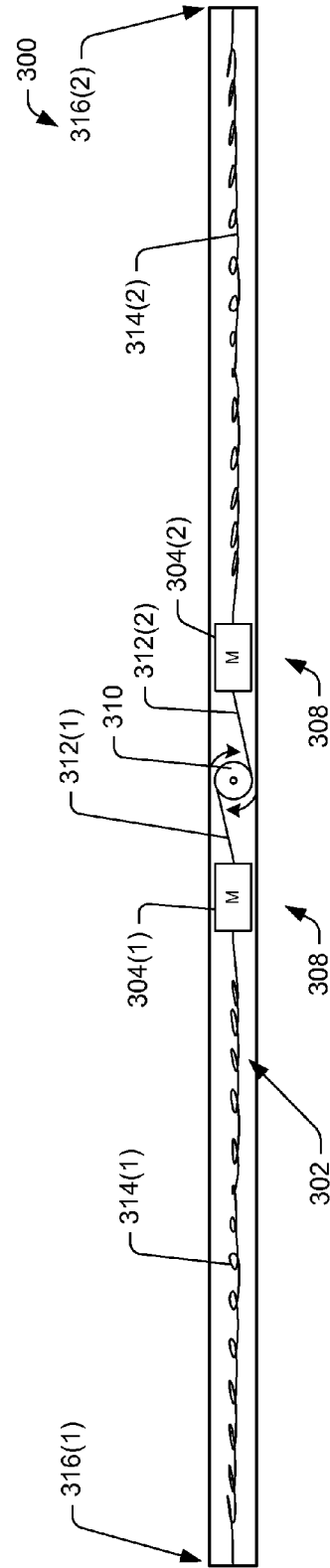

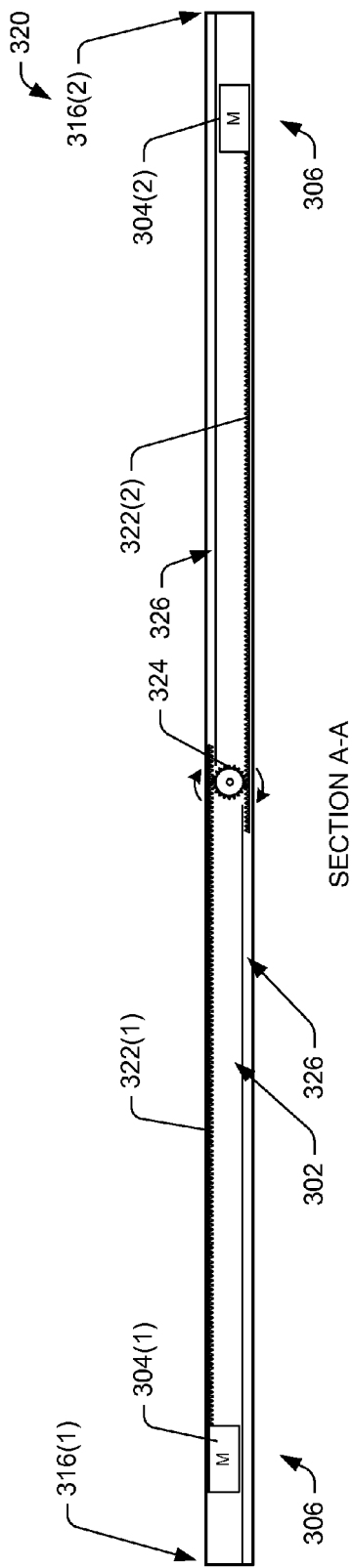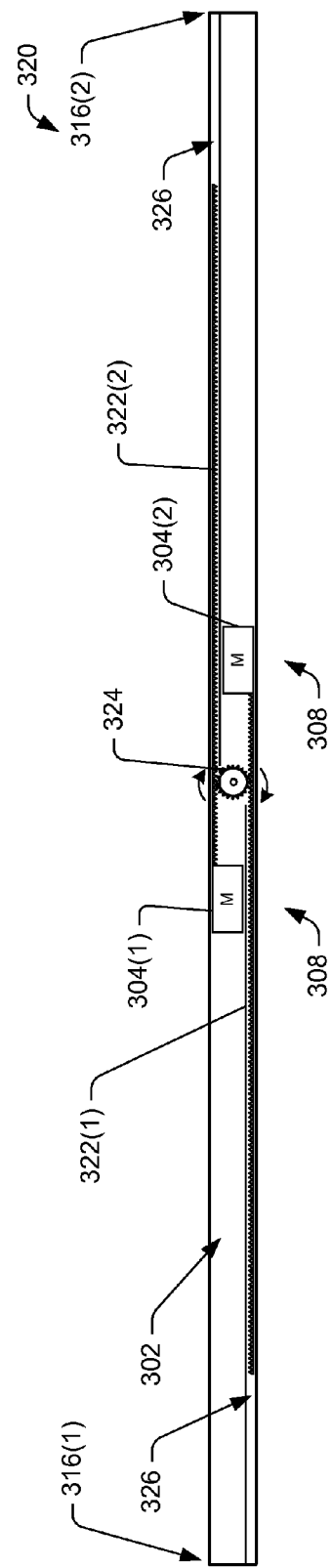

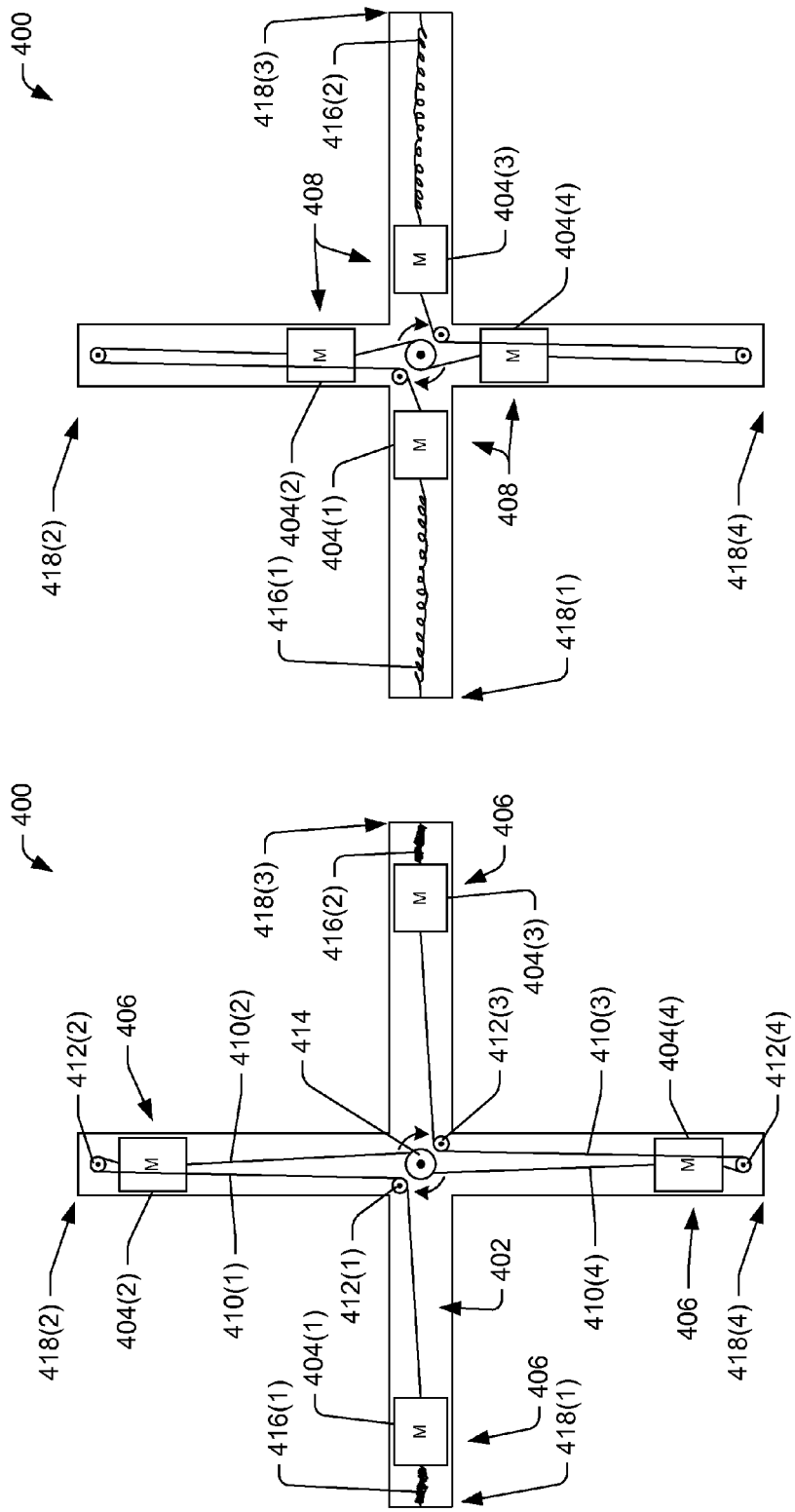

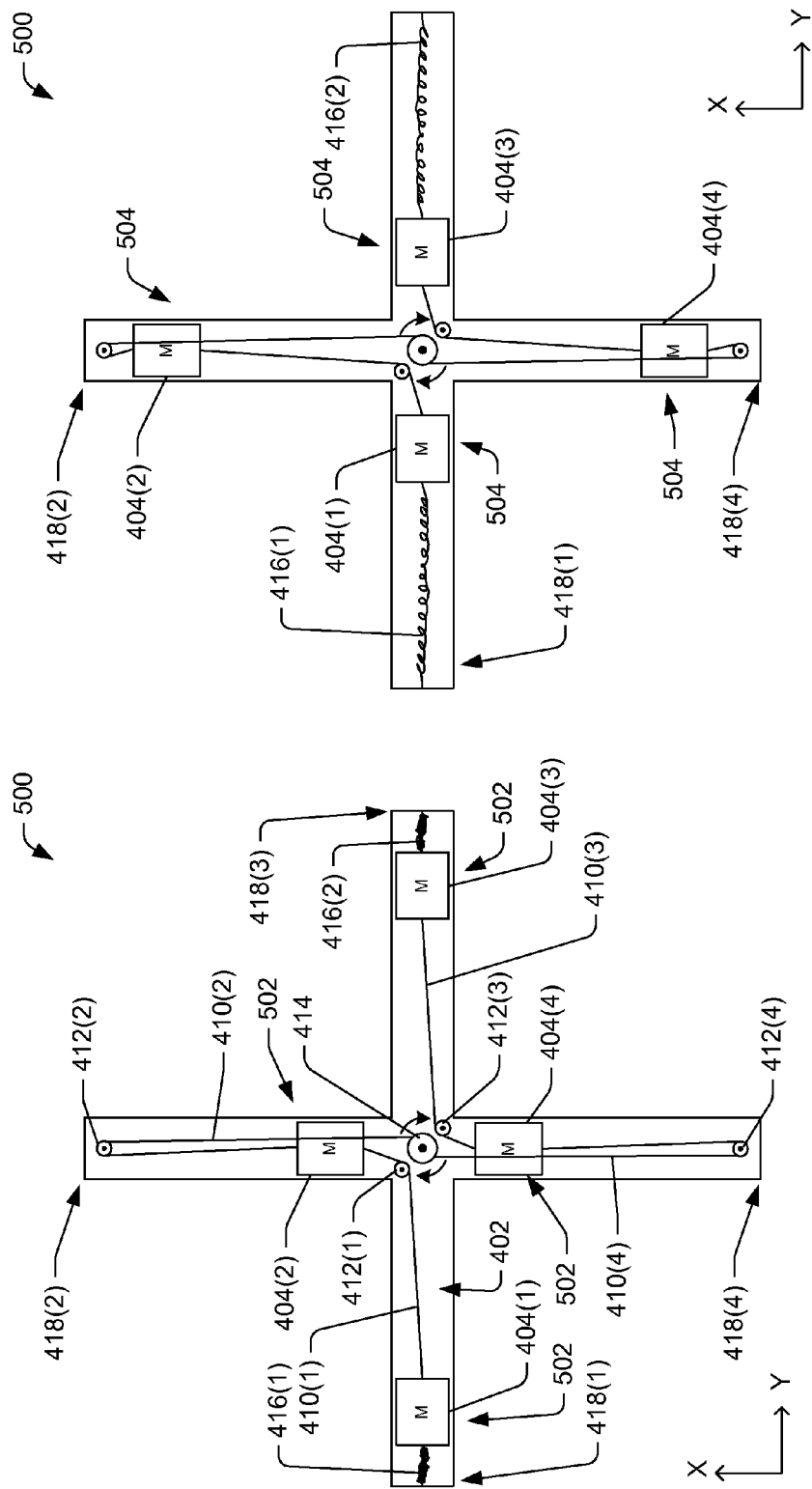

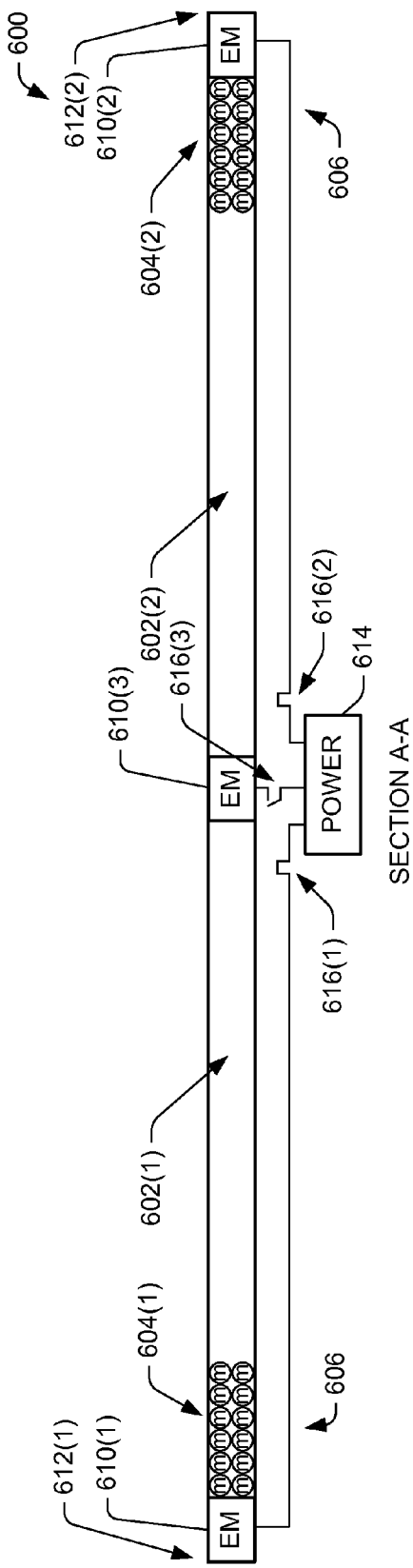
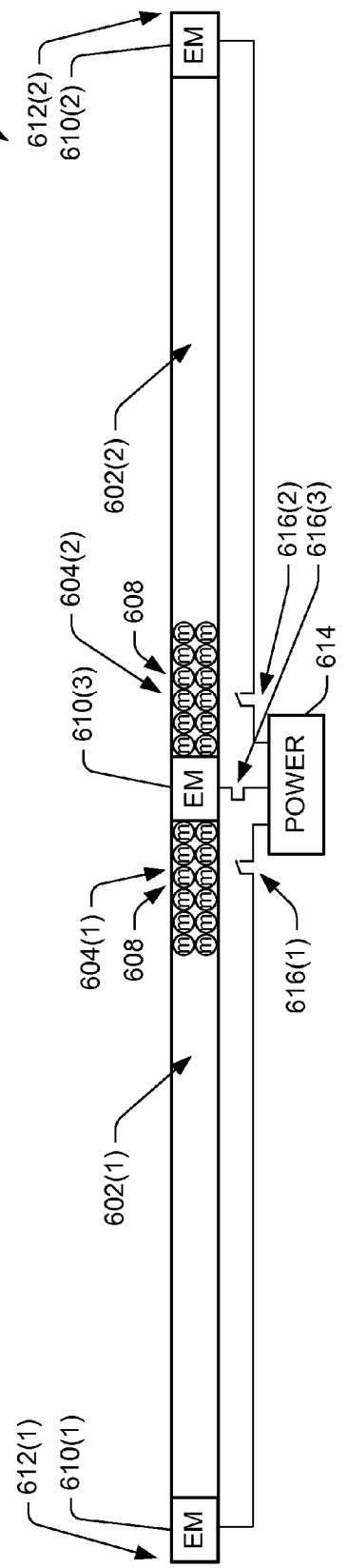
FIG. 6A
FIG. 6B

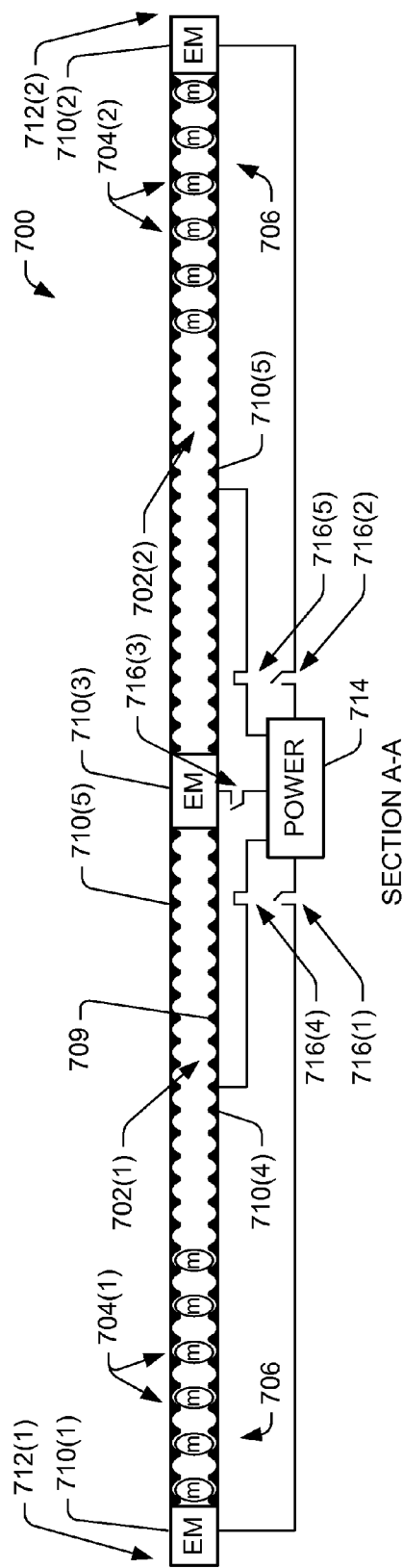
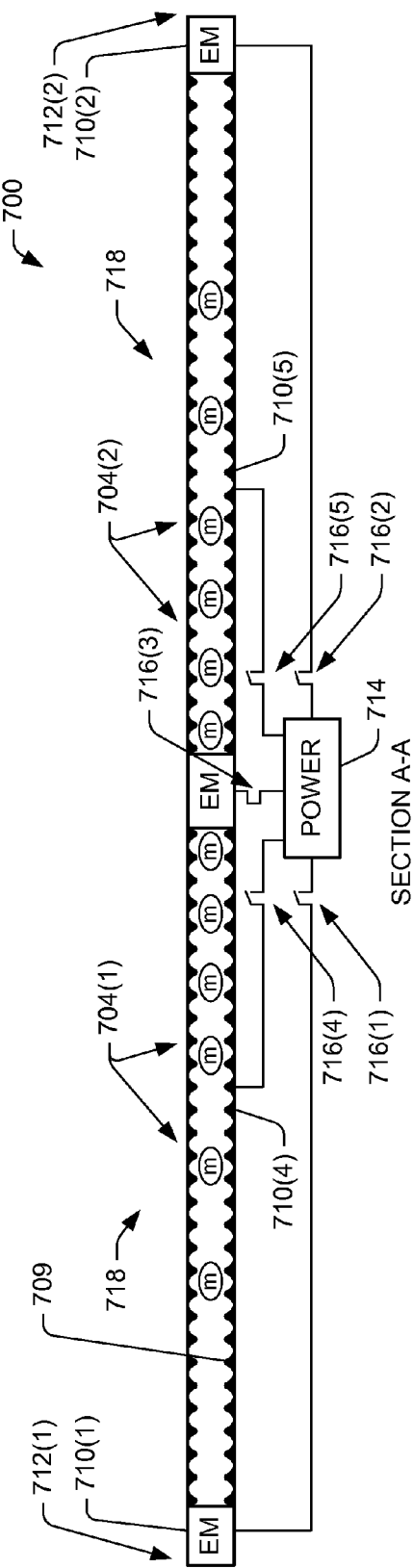
FIG. 7A
FIG. 7B

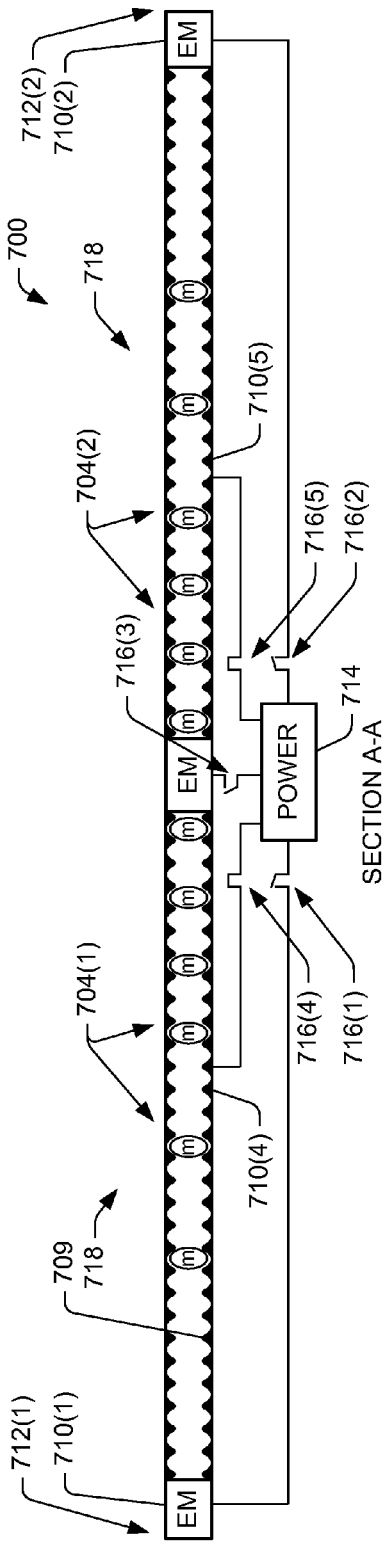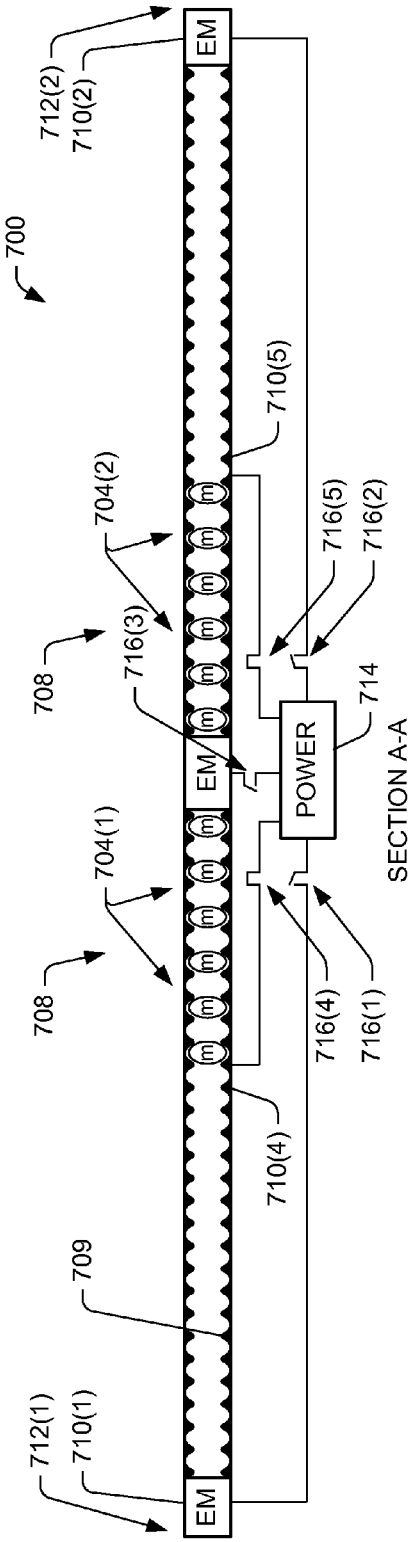

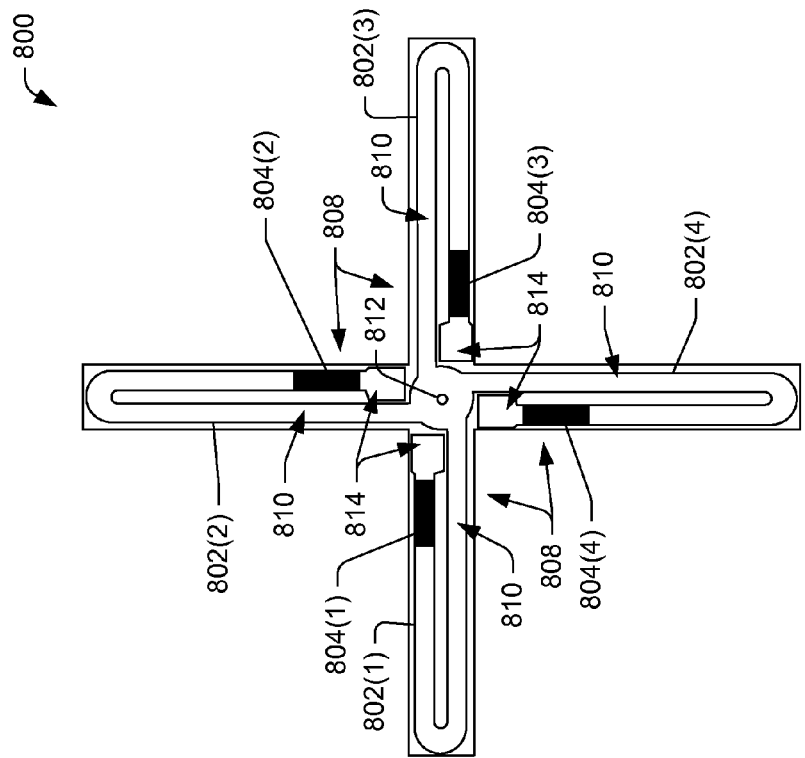
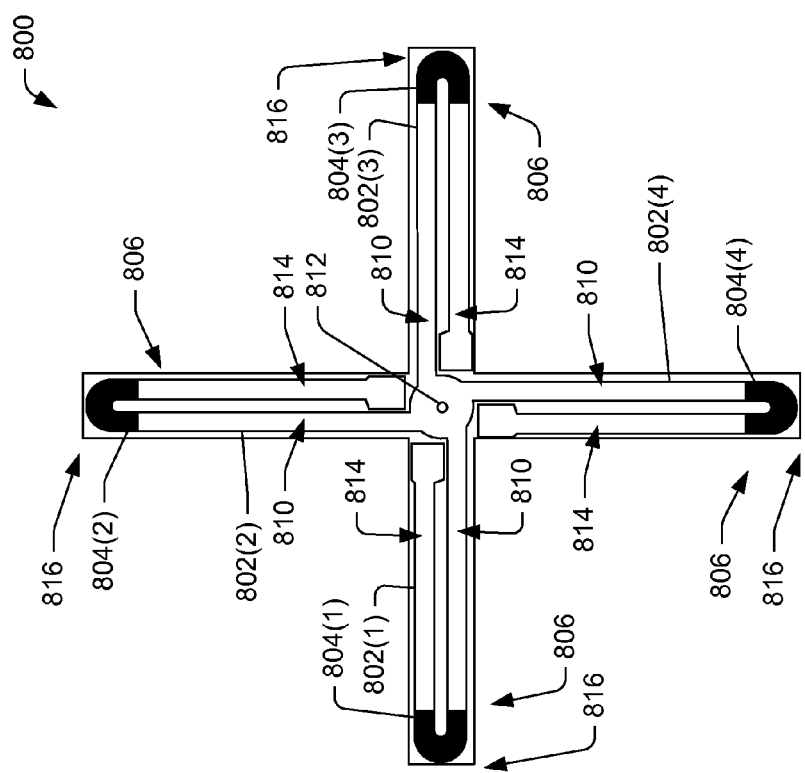
FIG. 8B
FIG. 8A

BALLAST CONTROL MECHANISMS FOR AERIAL VEHICLES

BACKGROUND

Automated aerial vehicles, sometimes referred to as drones or unmanned aerial vehicles (UAVs), have become commonly used by hobbyists, some commercial entities, and various militaries. Many of these aerial vehicles are used for image capture, for example, by hobbyists; however, many other uses exist. Automated aerial vehicles offer unique advantages and considerations as compared to their counterpart manned aerial vehicles (e.g., typical helicopters and fixed wing aircraft). For example, automated aerial vehicles may be smaller in overall size and lightweight as compared to their counterpart manned aerial vehicles. However, small and lightweight automated aerial vehicles present various challenges in control and operation, in particular, during changing environmental conditionals and/or during different stages of flight.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 3A-3B are cross-sectional side elevation views of some embodiments of the AAV of FIG. 1 showing an illustrative structure including movable ballast shown in a first position and second position, respectively, in accordance with some embodiments.

FIGS. 3C-3D are cross-sectional side elevation views of various embodiments of the AAV of FIG. 1 showing an illustrative structure including movable ballast and a rack and pinion shown in a first position and second position, respectively, in accordance with some embodiments.

FIGS. 4A-4B are schematic diagrams showing an illustrative structure including movable ballast that traverses along different sections of the structure and shown in a first position and second position, respectively, in accordance with some embodiments.

FIGS. 5A-5B are schematic diagrams showing an illustrative structure including movable ballast that traverses along different sections of the structure and shown in a third position and fourth position, respectively, in accordance with some embodiments.

FIGS. 6A-6B are cross-sectional side elevation views of some embodiments of the AAV of FIG. 1 showing an illustrative structure including movable magnetic ballast shown in a first position and second position, respectively, in accordance with some embodiments FIGS. 7A-7D are cross-sectional side elevation views of some embodiments of the AAV of FIG. 1 showing another illustrative structure including movable magnetic ballast shown in various positions, in accordance with some embodiments.

FIGS. 8A-8B are schematic diagrams showing an illustrative structure including pneumatic movable ballast shown in a first position and second position, respectively, in accordance with some embodiments.

DETAILED DESCRIPTION

This disclosure is directed to an automated aerial vehicle ("AAV") and systems, devices, and techniques pertaining to moveable ballast that is movable during operation and/or flight of the AAV. The AAV may include a frame or support structure that includes movable ballast. The AAV may include a ballast controller that causes movement of the ballast based on one or more factors, such as a type of flight (e.g., cruising, take off, landing, etc.), a type of operation of the AAV, a speed of the AAV, a triggering event, and/or other factors. The ballast may be moved along a linear or non-linear path (e.g., a curved path or partially curved path, etc.) using mechanical, electrical, electromagnetic, pneumatic, hydraulic, and/or other devices/techniques described herein. In some embodiments, the ballast may be moved or located in or toward a centralized position (e.g., center of mass, centroid) in the AAV to enable more agile operation, control, or maneuvering of the AAV. The ballast may be moved outward from the centralized location of the AAV to enable more stable operation, control, or maneuvering of the AAV.

The AAV may be implemented as virtually any type of aircraft. In some embodiments, the AAV may be a multi-rotor vertical takeoff and landing vehicle, such as a quad-copter, octocopter, or other multi-rotor aerial vehicle. In various embodiments, the AAV may include at least one fixed wing to provide at least some upward lift during forward flight of the AAV. The AAV may be configured to transition from rotor flight to a fixed-wing flight during operation, such as by redirecting rotors/propellers from a lift configuration to a forward propulsion configuration when the AAV includes at least one wing that provides upward lift.

The fuselage of the AAV may include one or more structures (or spars). The structures may be open structures (e.g., fins, I-beams, U-beams, etc.) or closed structures that include movable ballast. The structures may be linear or at least partially non-linear (e.g., curved). In some embodiments, the structures may be closed structures that include movable ballast within the structures. In various embodiments, the ballast may traverse between at least a first position and a second position, and may be substantially secured in at least each of the first position and the second position. For example, the ballast may be held in a position, at least partially by a biasing device, which may permit minimal movement of the ballast from deflections of the biasing device even when the ballast is in a secured state. However, the ballast may also be securely fixed in some embodiments, and completely restrained from moving, such as by using locking devices to secure the ballast in some positions.

Figure 1:
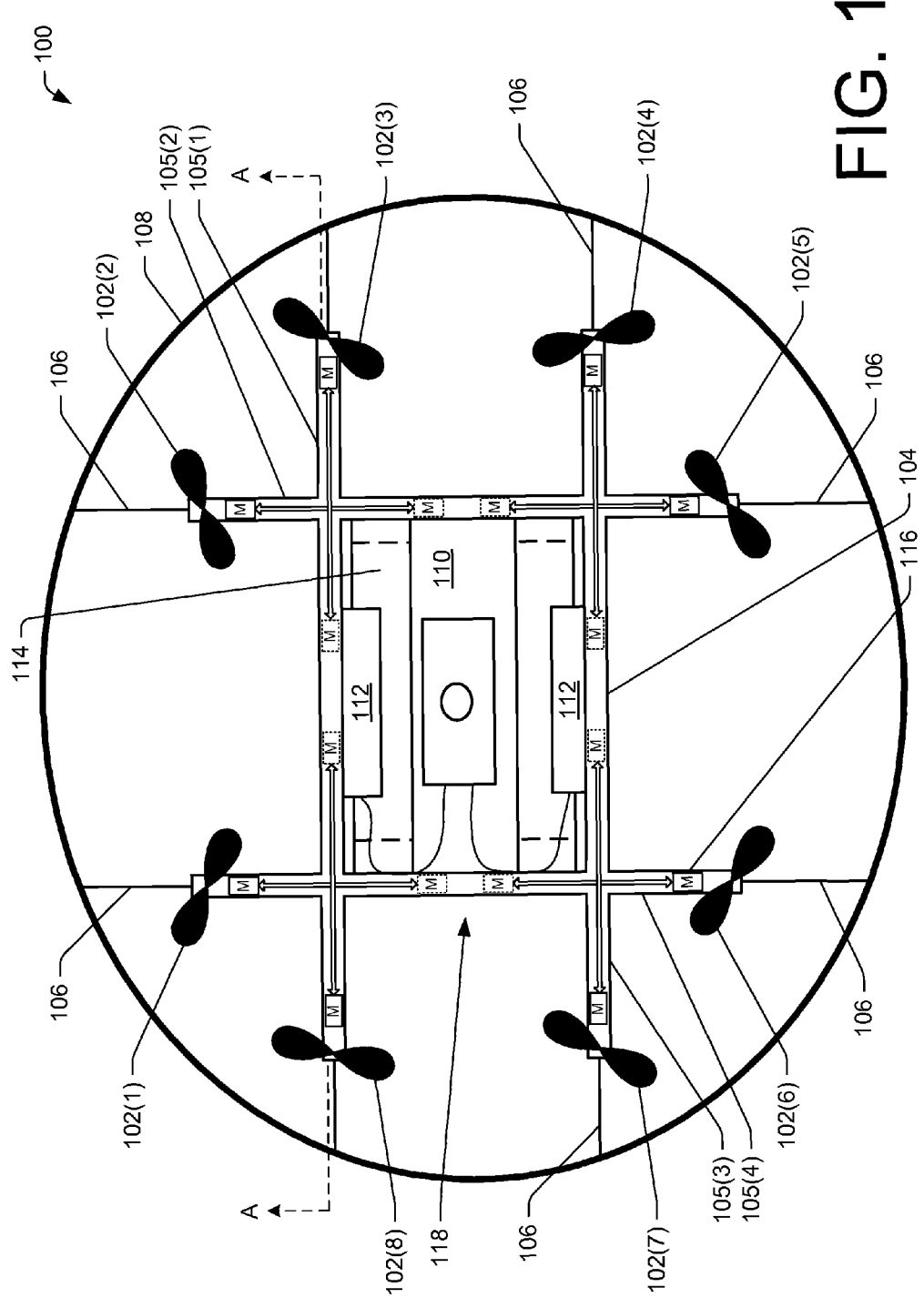
FIG. 1 is a top view of an illustrative automated aerial vehicle (AAV) that includes movable ballast usable to modify flight and maneuverability characteristics of the AAV.

FIG. 1 is a top view of an illustrative automated aerial vehicle (AAV) 100 that includes movable ballast usable to modify flight and maneuverability characteristics of the AAV 100. As illustrated, the AAV 100 includes eight propellers 102-1, 102-2, 102-3, 102-4, 102-5, 102-6, 102-7, 102-8 (also called rotors) spaced about a frame 104 of the AAV. The propellers 102 may be any form of propeller (e.g., graphite, carbon fiber) and of a size sufficient to lift the AAV 100 and any inventory/payload engaged by the AAV 100 so that the AAV 100 can navigate through the air, for example, to deliver an inventory item to a location/destination. While this example includes eight propellers, in other implementations, more or fewer propellers may be utilized. Likewise, in some implementations, the propellers may be positioned at different locations on the AAV 100. In addition, alternative methods of upward and/or forward propulsion may be utilized. For example, fans, jets, turbojets, turbo fans, jet engines, and the like may be used to propel the AAV.

The frame 104 or body of the AAV 100 may likewise be of any suitable material, such as graphite, carbon fiber, plastic, composite, and/or aluminum. In this example, the frame 104 of the AAV 100 includes four structures (or spars) 105-1, 105-2, 105-3, and 105-4 arranged in a hash pattern with the structures intersecting and joined at approximately perpendicular angles. However, more or fewer structures 105 may be included in the AAV. For example, as discussed below, the AAV may include two structures that intersect at or near a midpoint of each structure. The structures may be rigid or substantially rigid to allow minimal flex during operation of the AAV 100. The structures may include a circular, oval, square, or polynomial cross section in some embodiments. The structures may be linear or non-linear (e.g., curved or partially curved). However, the structures 105 may be formed as open structures such as U-beams, I-beams, and fins. In this example, structures 105-1 and 105-3 are arranged parallel to one another and are approximately the same length. In some embodiments, the structures 105-2 and 105-4 may be arranged parallel to one another, yet substantially perpendicular to structures 105-1 and 105-3. Some of the structures 105-2 and 105-4 may be approximately the same length or may be different lengths. In some embodiments, all of the structures 105 may be of approximately the same length, while in other implementations, some or all of the structures may be of different lengths. Likewise, the spacing between the two sets of structures may be approximately the same or different.

While the implementation illustrated in FIG. 1 includes four structures 105 that are joined to form the frame 104, in other implementations, there may be fewer or more components to the frame 104. For example, rather than four structures, in other implementations, the frame 104 of the AAV 100 may be configured to include six structures. In such an example, two of the structures 105-2, 105-4 may be positioned parallel to one another. Structures 105-1, 105-3 and two additional structures on either side of structures 105-1, 105-3 may all be positioned parallel to one another and perpendicular to structures 105-2, 105-4. With additional structures, additional cavities with structures on all four sides may be formed by the frame 104. A cavity within the frame 104 may be configured to include an inventory engagement mechanism for the engagement, transport and delivery of item(s) and/or containers that contain item(s).

Although the structures 105 are shown as being straight or linear structures, the structures may include some curvature in some embodiments. The structures may be coupled to one another at other angles besides ninety degrees to position and/or support the propellers 102 as discussed herein.

In some implementations, the AAV may be configured for aerodynamics. For example, an aerodynamic housing may be included on the AAV that encloses the AAV control system 110, one or more of the structures 105, the frame 104 and/or other components of the AAV 100. The housing may be made of any suitable material(s) such as graphite, carbon fiber, plastic, composite, aluminum, etc. Likewise, in some implementations, the location and/or the shape of the inventory (e.g., item or container) may be aerodynamically designed. For example, in some implementations, the inventory engagement mechanism may be configured such that, when the inventory is engaged, it is enclosed within the frame and/or housing of the AAV 100 so that no additional drag is created during transport of the inventory by the AAV 100. In other implementations, the inventory may be shaped to reduce drag and provide a more aerodynamic design of the AAV and the inventory. For example, if the inventory is a container and a portion of the container extends below the AAV when engaged, the exposed portion of the container may have a curved shape.

The propellers 102 and corresponding propeller motors are positioned at both ends of each structure 105. For inventory transport purposes, the propeller motors may be any form of motor capable of generating enough speed with the propellers to lift the AAV 100 and any engaged inventory thereby enabling aerial transport of the inventory. For example, for these purposes the propeller motors may each be a FX-4006-13 740 kv multi rotor motor. The propeller motors may be any form of motor (e.g., permanent magnet, brushless, etc.).

Extending outward from each structure is a support arm 106 that is connected to a barrier 108. In this example, the barrier is positioned around and attached to the AAV 100 in such a manner that the motors and propellers 102 are within the perimeter of the barrier 108. The barrier may be plastic, rubber, etc. Likewise, depending on the length of the support arms 106 and/or the length, number or positioning of the structures 105, the barrier may be round, oval, or any other shape. In some embodiments, multiple barriers may be used, such as placement of a barrier around each propeller or some groups of the propellers. The barriers may protect the propellers from damage and/or protect other objects from damage by preventing the propellers from engaging other objects.

Mounted to the frame 104 is an AAV control system 110. In this example, the AAV control system 110 is mounted centrally and on top of the frame 104. The AAV control system 110, as discussed in further detail below with respect to FIG. 10, controls the operation, routing, navigation, communication, ballast movement, and the inventory engagement mechanism of the AAV 100.

Likewise, the AAV 100 includes one or more power modules 112. In this example, the AAV 100 includes two power modules 112 that are removably mounted to the frame 104. The power module for the AAV may be in the form of battery power, solar power, gas power, super capacitor, fuel cell, alternative power generation source, or a combination thereof. For example, the power modules 112 may each be a 6000 mAh lithium-ion polymer battery, polymer lithium ion (Li-poly, Li-Pol, LiPo, LIP, PLI or Lip) battery. The power module(s) 112 are coupled to and provide power for the AAV control system 110 and the propeller motors.

As mentioned above, the AAV 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the structures 105. The inventory engagement mechanism may be positioned beneath the AAV control system 110. In implementations with additional structures, the AAV may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the AAV control system 110.

While the implementations of the AAV discussed herein utilize propellers to achieve and maintain flight, in other implementations, the AAV may be configured in other manners. For example, the AAV may include fixed wings and/or a combination of both propellers and fixed wings as described with respect to FIG. 9. For example, the AAV may utilize one or more propellers to enable takeoff and landing and a fixed wing configuration or a combination wing and propeller configuration to sustain forward flight while the AAV is airborne.

Returning to the structures 105, at least some of the structures 105 may include or facilitate movement of ballast 116, also labeled "M" in FIG. 1. The structures 105 may include ballast in a cavity formed by the structures when the structures are formed as tubes, U-shaped structures, etc. The ballast 116 may be moveable outside of a structure, but coupled to the structure, such as on rails, guides, or other coupling mechanisms. The ballast 116 may traverse between a first position and a second position along a structure to modify a distribution of weight about the frame 104. For illustrative purposes, the ballast 116 is shown in a first position using solid lines and a second position using dashed lines. In accordance with one or more embodiments, the ballast 116 may be moved to a centralized location 118 of the frame 104, such as proximate to or near the AAV control system 110, which may adjust a polar moment of inertia and may allow more agile operation, control, or maneuvering of the AAV 100. The ballast 116 may be moved outward from the centralized location of the AAV, which may adjust a polar moment of inertia and may allow more stable operation, control, or maneuvering of the AAV 100. Additional details and embodiments of the ballast 116 and structures 105 are described below with reference to FIGS. 3-8.

Figure 2:
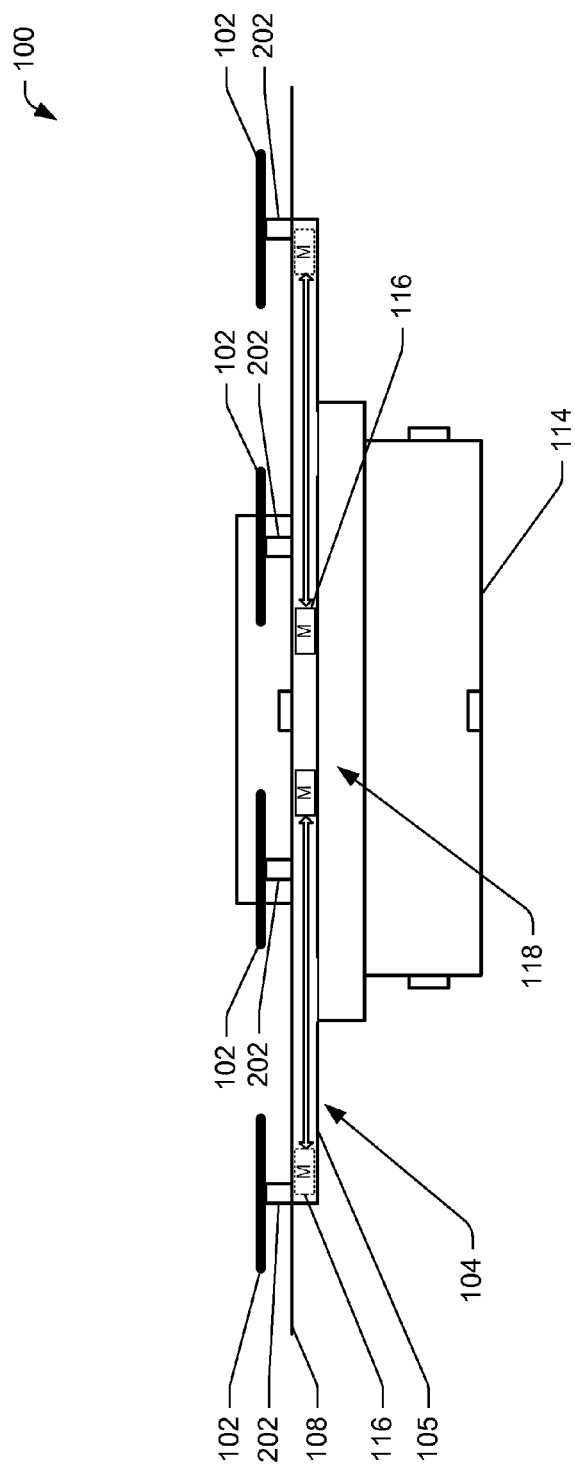
FIG. 2 side elevation view of the illustrative AAV shown in FIG. 1.

FIG. 2 side elevation view of the illustrative AAV 100 shown in FIG. 1. In the side view of the AAV illustrated in FIG. 2, four motors 202 and propellers 102 are visible. In other implementations, additional or fewer of the motors 202 and/or the propellers 102 may be included in the AAV 100. In this example, the motors 202 may all be mounted at 90 degrees with respect to the AAV 100. In some embodiments, the mountings of the motors may be adjustable such as to enable use of at least some of the propellers 102 to create forward propulsion during forward flight. Although the ballast is shown as moving along two axes in FIGS. 1 and 2, the ballast may traverse along any direction to enable adjustment of the polar moment of inertia and/or for other reasons.

FIGS. 3A and 3B are cross-sectional side elevation views along Section A-A of some embodiments of the AAV 100 of FIG. 1 showing an illustrative structure 300, which may be one of the structures 105 discussed above. The structure 300 may include a track 302 that enables movement of ballast 304 from a first position 306, shown in FIG. 3A to a second position 308, shown in FIG. 3B. The track 302 may be a recess or cavity of the structure 300 (e.g., inside the structure), a rail, a groove, and/or any other feature that controls movement of ballasts 304(1), 304(2) along at least one axis, inside or outside of the structure 300.

As shown in FIG. 3A, the ballasts 304(1), 304(2) may be coupled to a wheel 310 by cables 312(1), 312(2), respectively. The wheel 310 may be a spool, a spindle, a pinion, a friction wheel, or any other type of feature that enables movement of the ballast through rotation. The cables 312 may be formed of practically any type of material that can sustain a tensile force, such as steel, carbon, or other materials. As used herein, the term "cable" may include use of ropes, wires, or other non-metallic and non-braided materials. As the wheel 310 rotates in a clockwise direction, as viewed from the perspective shown in FIG. 3A, the wheel 310 may cause the ballasts 304(1), 304(2) to move in a first direction toward the wheel 310 as the cable is wrapped around the wheel (as a spindle), and thus toward a centralized location (e.g., the centralized location 118 shown in FIG. 1). Biasing devices 314(1), 314(2) may be coupled to the ballasts 304(1), 304(2), respectively, and may oppose a force applied by the wheel 310. Thus, the biasing devices 314(1), 314(2) may enable movement of the ballast 304(1), 304(2) in a second direction, opposite the first direction, toward ends 316(1), 316(2) of the structure 300.

In some embodiments, additional cables may be coupled to the ballasts 304(1), 304(2) to cause movement in the second direction in addition to use of the biasing devices 314 or in lieu of the biasing devices 314. The additional cables may be coupled to the same wheel 310, possibly using a pulley located at the ends 316(1), 316(2). In this configuration, the wheel 310 would be configured for powered rotation in both a clockwise direction and a counter-clockwise direction. As shown in the first position 306, the ballast 304 may distribute weight of the structure 300 outward from the wheel 310, and thus may cause the AAV 100 to adjust a polar moment of inertia and experience more stable operation, control, or maneuvering during operation and/or flight of the AAV 100.

As shown in FIG. 3B, the ballasts 304(1), 304(2) are located in the second position 308, which may be a centralized location (e.g., the centralized location 118 shown in FIG. 1). As shown in the second position 308, the ballast 304 may distribute weight of the structure 300 inward toward the wheel 310, and thus may adjust a polar moment of inertia and cause the AAV 100 to experience more agile operation, control, or maneuvering during operation and/or flight of the AAV 100. The ballasts 304(1), 304(2) may be moved back to the first position 306 proximate to the ends 316 by reducing torque of the wheel 310 such that a force applied by the biasing devices 314 causes the ballasts 304 to move toward the first position 306. However, as discussed above, additional cables may be used to pull the ballasts 304 toward the first position 306.

In still further embodiments, a rack and pinion may be used to move the ballasts where teeth of the rack engage teeth of the wheel (pinion), and cause movement of the ballast in a first direction and/or a second direction, as shown in FIGS. 3C and 3D. Although the structure 300 shows two opposing ballasts, more or fewer ballasts may be moved in accordance with various embodiments. In some embodiments, the structure 300, the ballasts, or any other structure discussed herein, may include locking mechanisms that lock or secure the ballast in a particular position. The lock may be implemented as a pin that inserts into an aperture of the ballast, and thereby prevents the ballast to traverse along the track 302 when the pin is engaged in the ballast. Other locking mechanisms may be used that cause friction and/or mechanically interact and/or engage with the ballast and/or the structure, including mechanical locks, magnetic locks, and so forth. The locks may mitigate vibrations caused by biasing devices, cables, racks, or other structures/components. In various embodiments, the ballast may be ejected from the structure in various situations, such as to quickly adjust the polar moment of inertia. However, such ejection of the ballast may terminate future movement of the ballast until the ballast is replaced, such as after maintenance of the AAV 100.

FIGS. 3C-3D are cross-sectional side elevation views along Section A-A of various embodiments of the AAV of FIG. 1 showing an illustrative structure 320, which may be one of the structures 105 discussed above. The structure 320 may function similar to the structure 300 while using a rack 322(1) and a rack 322(2), movable by at least a pinion 324, to move the ballasts 304. In some embodiments, the track 302 may allow for a clearance space 326 to accommodate movement of the rack, such as when the ballasts are situated in the second position 308 shown in FIG. 3D. However, in some configurations, the clearance space 326 may not be necessary or may be located in different places.

In various embodiments, the rack and pinion may allow for independent movement of at least some of the ballasts. For example, use of two pinions may allow a first ballast to be moved while a second ballast may be held stationary. The rack and pinion may include an inherent locking mechanism that allows the pinion to "lock" placement of the ballast in any specific positions/locations, such as the first position 306, the second position 308, and/or any intermediate position(s).

FIGS. 4A-4B are schematic diagrams showing an illustrative structure 400 including movable ballast that traverses along different sections of the structure 400. As shown, the structure 400 may include two portions of the structures 105 as described above such that the portions intersect one another, possibly in a perpendicular fashion. The structure 400 may include a track 402 that enables movement of ballasts 404 from a first set of positions 406, shown in FIG. 4A to a second set of positions 408, shown in FIG. 4B. The track 402 may be a recess or cavity of the structure, a rail, a groove, and/or any other feature that controls movement of ballasts 404 along at least one axis. Although four ballasts are shown in FIG. 4A, other quantities of ballasts may be used, such as two ballasts where one ballast moves along a first axis and another ballast moves along a second, different axis.

As shown in FIG. 4A, ballast 404(1) may be coupled to ballast 404(2) by a cable 410(1) that is guided through two arms of the structure 400 by pulleys 412(1) and 412(2), while the ballast 404(2) may be coupled to a wheel 414 by a cable 410(2). Similarly, ballast 404(3) may be coupled to ballast 404(4) by a cable 410(3) that is guided through the other two arms of the structure 400 by pulleys 412(3) and 412(4), while the ballast 404(4) may be coupled to the wheel 414 by a cable 410(4). The cables 410 may be formed of practically any type of material that can sustain a tensile force, such as steel, carbon, or other materials. As the wheel 414 rotates in a clockwise direction, as viewed from the perspective shown in FIG. 4A, the wheel 414 may cause the ballasts 404 to move in a direction toward the wheel 412, and thus toward a centralized location of the structure 400. In some embodiments, when the structure 400 is one of multiple structures included in the AAV 100, the ballasts 404 may move to a particular location in the structure 400 that is nearest a centralized location of the AAV (e.g., the centralized location 118 shown in FIG. 1). Thus, each of the multiple structures may cause respective ballasts to move toward or away from the centralized location 118 when multiple structures are used in the AAV 100. However, in some embodiments, the AAV may be formed of the structure 400, and without other structures that include moveable ballast, for example.

Biasing devices 416(1), 416(2) may be coupled to the ballasts 404(1), 404(3), respectively, and may oppose a force applied by the wheel 414. Thus, the biasing devices 416(1), 416(2) may enable movement of the ballast 404(1), 404(2), 404(3), 404(4) in opposite directions as discussed above, and toward ends 418(1), 418(2), 418(3), 418(4), respectively, of the structure 400. In some embodiments, additional cables may be coupled to the ballasts 404(1), 404(3) to cause movement of the ballasts toward the ends 418. The additional cables may be coupled to the same wheel 414, possibly using a pulley located at the ends 418(1), 418(3). In this configuration, the wheel 414 would be configured for powered rotation in both a clockwise direction and a counter-clockwise direction. As shown in the first position 406, the ballast 404 may distribute weight of the structure 400 outward from the wheel 414, and thus may cause an AAV formed of a single instance of the structure 400 to adjust a polar moment of inertia and experience more stable operation, control, or maneuvering during operation and/or flight of the AAV.

As shown in FIG. 4B, the ballasts 404 are located in the second position 408, which may be a centralized location of the structure 400. As shown in the second position 408, the ballast 404 may distribute weight of the structure 400 inward toward the wheel 414, and thus may cause an AAV formed of a single instance of the structure 400 to experience more agile operation, control, or maneuvering during operation and/or flight of the AAV. The ballasts 404 may be moved back to the first position 406 proximate to the respective ends 418 by reducing torque of the wheel 414 such that a force of the biasing devices 416 causes the ballasts 404 to move toward the first position 406. However, as discussed above, additional cables may be used to pull the ballasts 404 toward the first position 406. In still further embodiments, a rack and pinion may be used to move the ballasts where the teeth engage the wheel (pinion), and cause movement of the ballast, as shown in FIGS. 3C and 3D. To move ballast along multiple axes, the racks may engage different parts of the pinion. In various embodiments, the rack and pinion may allow for independent movement of at least some of the ballasts. Although the structure 400 shows four opposing ballasts, more or fewer ballasts may be moved in accordance with various embodiments.

FIGS. 5A-5B are schematic diagrams showing an illustrative structure 500 including movable ballast that traverses along different sections of the structure 500. The structure 500 may be similar to the structure 400 with some minor changes, as noted below. The structure 500 may include the track 402 that enables movement of ballast 404 from a first set of positions 502, shown in FIG. 5A to a second set of positions 504, shown in FIG. 5B.

In the structure 500, the ballast 404(1) may be coupled to the ballast 404(2) by the cable 410(1) which is guided by the pulley 412(1). The ballast 404(2) may be coupled to the wheel 414 by the cable 410(2) which is guided by the pulley 412(2). Similarly, the ballast 404(3) may be coupled to the ballast 404(4) by the cable 410(3) which is guided by the pulley 412(3). The ballast 404(4) may be coupled to the wheel 414 by the cable 410(4) which is guided by the pulley 412(4). As the wheel 414 rotates in a clockwise direction, as viewed from the perspective shown in FIG. 5A, the wheel 414 may cause the ballast 404(1) and 404(3) to move in directions toward the wheel 412, and thus toward a centralized location of the structure 500, while the ballasts 404(2)

and 404(4) may be caused to move away from the centralized location. As shown in the first position 502, the ballast 404 may distribute weight of the structure 400 along a first axis (e.g., Y-axis), and thus may cause an AAV formed of a single instance of the structure 500 to adjust a polar moment of inertia and experience more agile operation, control, or maneuvering of roll during flight of the AAV in the Y-direction while experiencing more stable operation, control, or maneuvering of pitch during flight in the Y-direction.

As shown in FIG. 5B, the ballasts 404 are located in the second position 504. As shown in the second position 504, the ballast 404 may distribute weight of the structure 400 along a second axis (e.g., X-axis), and thus may cause an AAV formed of a single instance of the structure 500 to adjust a polar moment of inertia and experience more agile operation, control, or maneuvering of pitch during flight of the AAV in the Y-direction while experiencing more stable operation, control, or maneuvering of roll during flight in the Y-direction.

FIGS. 6A-6B are cross-sectional side elevation views along Section A-A of some embodiments of the AAV 100 of FIG. 1 showing an illustrative structure 600, which may be one of the structures 105 discussed above, including movable magnetic and/or ferromagnetic ballast. The structure 600 may include tracks 602(1), 602(2) that enable movement of ballast 604(1), 604(2) from a first position 606, shown in FIG. 6A, to a second position 608, shown in FIG. 6B. The tracks 602 may be a recess or cavity of the structure 600 and/or any other feature that controls movement of ballasts 604(1), 604(2) along at least one axis. In some embodiments, the tracks 602 may be cavities that include a fluid and/or gas that suspends the ballasts 604 and allows the ballasts 604 to move about the cavity under certain conditions, such as in response to a change in a magnetic field of the structure 600, as discussed below. The ballast 604 may be formed of a plurality of magnetic or ferromagnetic particles.

As shown in FIG. 6A, the structure 600 may include electromagnets 610(1), 610(2), 610(3), where electromagnets 610(1), 610(2) are located near opposite ends 612(1), 612(2), respectively, of the structure 600 while the electromagnet 610(3) is centrally located between the electromagnets 610(1), 610(2). The electromagnets 610(1), 610(2), 610(3) may be connected to a power source 614 via switches 616(1), 616(2), 616(3), respectively, that allow or prevent electrical current to flow to the respective electromagnets. As shown in FIG. 6A, the switches 616(1), 616(2) may be closed to cause the electromagnets 610(1), 610(2) to attract the ballasts 604 toward the first position 606. As shown in the first position 606, the ballasts 604 may distribute weight of the structure 600 outward towards the ends 612, and thus may cause the AAV 100 to adjust a polar moment of inertia and experience more stable operation, control, or maneuvering during operation and/or flight of the AAV 100.

As shown in FIG. 6B, the ballasts 604 are located in the second position 608, which may be a centralized location (e.g., the centralized location 118 shown in FIG. 1). The ballast 604 may be caused to move to the second position 608 by closing the switch 616(3) and opening the switches 616(1), 616(2). As shown in the second position 608, the ballast 604 may distribute weight of the structure 600 inward toward the center of mass of the structure 600, and thus may cause the AAV 100 to experience more agile operation, control, or maneuvering during operation and/or flight of the AAV 100.

FIGS. 7A-7D are cross-sectional side elevation views along Section A-A of some embodiments of the AAV 100 of FIG. 1 showing another illustrative structure 700 including movable magnetic ballast. The structure 700 may include tracks 702(1), 702(2) that enable movement of ballast 704(1), 704(2) from a first position 706, shown in FIG. 7A, to a second position 708, shown in FIG. 7D. The tracks 702 may be a recess or cavity of the structure 700 and/or any other feature that controls movement of ballasts 704(1), 704(2) along at least one axis. In some embodiments, the tracks 702 may be cavities that include a fluid and/or gas that suspends the ballast 704 and allows the ballast 704 to move about the cavity under certain conditions, such as in response to a change in a magnetic field of the structure 700, as discussed below. The ballast 704 may be formed of a plurality of magnetic or ferromagnetic particles. The ballast 704 may be formed as rods, ellipses, or other oblong shapes that include a longitudinal body having a length that is greater than a width. The ballast 704 may be aligned in a direction by applying a magnetic force and aligned in a second direction by removing the magnetic force (or vice-versa). By rotating the ballast, the ballast may lock into features 709 of the tracks 702, as shown in FIGS. 7A, 7C, and 7D, whereas in FIG. 7B, the ballast 702 is aligned with the electromagnets 710(1), 710(2), 710(3), and movable toward the ends 712 or toward the electromagnet 710(3).

As shown in FIG. 7A, the structure 700 may include electromagnets 710(1), 710(2), 710(3), 710(4), 710(5) where electromagnets 710(1), 710(2) are located near opposite ends 712(1), 712(2), respectively, of the structure 700 while the electromagnet 710(3) is centrally located between the electromagnets 710(1), 710(2). The electromagnets 710(4), 710(5) may be used to rotate the ballast 704 to engage the features 709 when the electromagnets 710(4), 710(5) receive current, as shown in FIG. 7A. By removing the current, the ballast may rotate ninety degrees, as shown in FIG. 7B. The electromagnets 710(1), 710(2), 710(3), 710(4), 710(5) may be connected to a power source 714 via switches 716(1), 716(2), 716(3), 716(4), 716(5), respectively, that allow or prevent electrical current to flow to the respective electromagnets. Just prior to the arrangement of the ballast 704 shown in FIG. 7A, the switches 716(1), 716(2) were closed to cause the electromagnets 710(1), 710(2) to attract the ballasts 704 toward the first position 706 while the switches 716(3), 716(4), 716(5) were open. However, to reorient the ballast, and lock the ballast 704 into the features 709, the switches 716(4), 716(5) were closed while the switches 716(1), 716(2) were opened. The switch 716(3) remained open. As shown in the first position 706, the ballasts 704 may distribute weight of the structure 700 outward towards the ends 712, and thus may cause the AAV 100 to adjust a polar moment of inertia and experience more stable operation, control, or maneuvering during operation and/or flight of the AAV 100.

As shown in FIG. 7B, the ballast 704 has traversed from the first position 706 shown in FIG. 7A to an intermediate position 718 as follows. To achieve this movement of the ballast, first, all switches may have been opened, and then the switch 716(3) may have been closed which caused the ballast to move toward the electromagnet 710(3). Given more time to traverse, the ballast 704 may group together proximate to the electromagnet 710(3).

As shown in FIG. 7C, the ballast 704 has rotated and locked into the features 709 at the intermediate position. This may allow the AAV to distribute weight of the ballast 704 across the structure 700 rather than centralizing the weight in a particular location as shown in FIGS. 7A and 7D. To rotate the ballast as shown in FIG. 7C from the previous state (shown in FIG. 7B), all the switches 716 may have been opened, and then the switches 716(4) and 716(5) may have been closed which caused the ballast to rotate and lock into the features 709.

As shown in FIG. 7D, the ballasts 704 are located in the second position 708, which may be a centralized location (e.g., the centralized location 118 shown in FIG. 1). The ballasts may be moved to the second location 708 by performing the switch operations described above with reference to FIGS. 7B and 7C, but allowing more time in the state shown in FIG. 7B to allow the ballasts to move proximate to the electromagnet 710(3). As shown in the second position 708, the ballast 704 may distribute weight of the structure 700 inward toward the center of mass of the structure 700, and thus may cause the AAV 100 to experience more agile operation, control, or maneuvering during operation and/or flight of the AAV 100.

The above described configuration of electromagnets can be modified to achieve the same or similar results by use of different variations of opening and closing of switches, providing or cutting off current to attract or repel ballast, and/or to rotate/lock the ballast. Thus, the switches and electrical configuration shown and described with respect to FIGS. 7A-7D is just one example of many possible configurations that may be used to control movement and orientation of ballast.

In some embodiments, the configuration shown in the structure 700 may use various combinations of permanent magnets and electromagnets. For example, permanent magnets may be used to cause the ballast to move to a first, default position and/or assume a first, default orientation, without use of power that would be used by an electromagnet to achieve such a result. The magnetic attraction of a permanent magnet may be overcome by use of electromagnets and/or use of insulators. For example, insulators may at least partially shield the ballast from being attracted by at least some of the permanent magnets. In various embodiments, the structure 700 may be configured to minimize power consumption by electromagnets, for example, by using permanent magnets to cause the ballast to be positioned in a most common position and/or oriented in a most common orientation.

FIGS. 8A-8B are schematic diagrams showing an illustrative structure 800 including pneumatic and/or hydraulic movable ballast that traverses along different sections of the structure 800. As shown, the structure 800 may include two portions of the structures 105 as described above such that the portions intersect one another, possibly in a perpendicular fashion. The structure 800 may include tubes 802 that create a pressure vessel that enables movement of ballasts 804 from a first set of positions 806, shown in FIG. 8A, to a second set of positions 808, shown in FIG. 8B. The tubes 802 may be pressure vessels that can sustain an internal pressure as described below. The tubes may be formed of aluminum, graphite, carbon fiber, plastic, or any other rigid material.

As shown in FIG. 8A, ballast 804(1), 804(2), 804(3), 804(4) may be movably positioned inside of tubes 802(1), 802(2), 802(3), 802(4), respectively. The ballasts 804 may act as plugs that move within the tubes 802, but prevent air/gas/fluid from passing by the ballast in the tube. Thus, increases/decreases in pressure in the tubes may cause controlled movement of the ballasts within the tubes. As a pressure increases in a first portion 810 of the tubes, possibly by air or another gas or fluid input from an orifice 812, the ballasts 804 may traverse along the tubes 802 from the first position 806 to the second position (shown in FIG. 8B). The first portion 810 may include a first substance that is separated by the ballast 804 from a second substance in a second portion 814 of the tubes 802. In some instances, the first substance may be the same as the second substance. As the pressure decreases, the ballast 804 may be caused to traverse from the second position 808 to the first position 806. As shown in the first position 806 in FIG. 8A, the ballast 804 may distribute weight of the structure 800 outward from the orifice 812, and thus may cause an AAV formed of a single instance of the structure 800 to adjust a polar moment of inertia and experience more stable operation, control, or maneuvering during operation and/or flight of the AAV.

As shown in FIG. 8B, the ballasts 804 are located in the second position 808, which may be a centralized location of the structure 800. As shown in the second position 808, the ballast 804 may distribute weight of the structure 800 inward toward the orifice 812, and thus may cause an AAV formed of a single instance of the structure 800 to experience more agile operation, control, or maneuvering during operation and/or flight of the AAV. The ballasts 804 may be moved back to the first position 806 proximate to the respective ends 816 by reducing pressure in the tubes 802 accessible by the orifice 812, such as by releasing air, gas, or fluid from the tubes 802 via the orifice 812. Although the structure 800 shows four opposing ballasts, more or fewer ballasts may be moved in accordance with various embodiments.

In some embodiments, the ballast may be formed of a non-malleable substance, and may not move around curved sections of the tubes. In some embodiments, the configuration shown in FIGS. 8A and 8B may be akin to mercury that is movable in alcohol. The ballast 804, or any other ballast discussed herein, may be formed of rare earth materials that exhibit high density.

Figure 9:
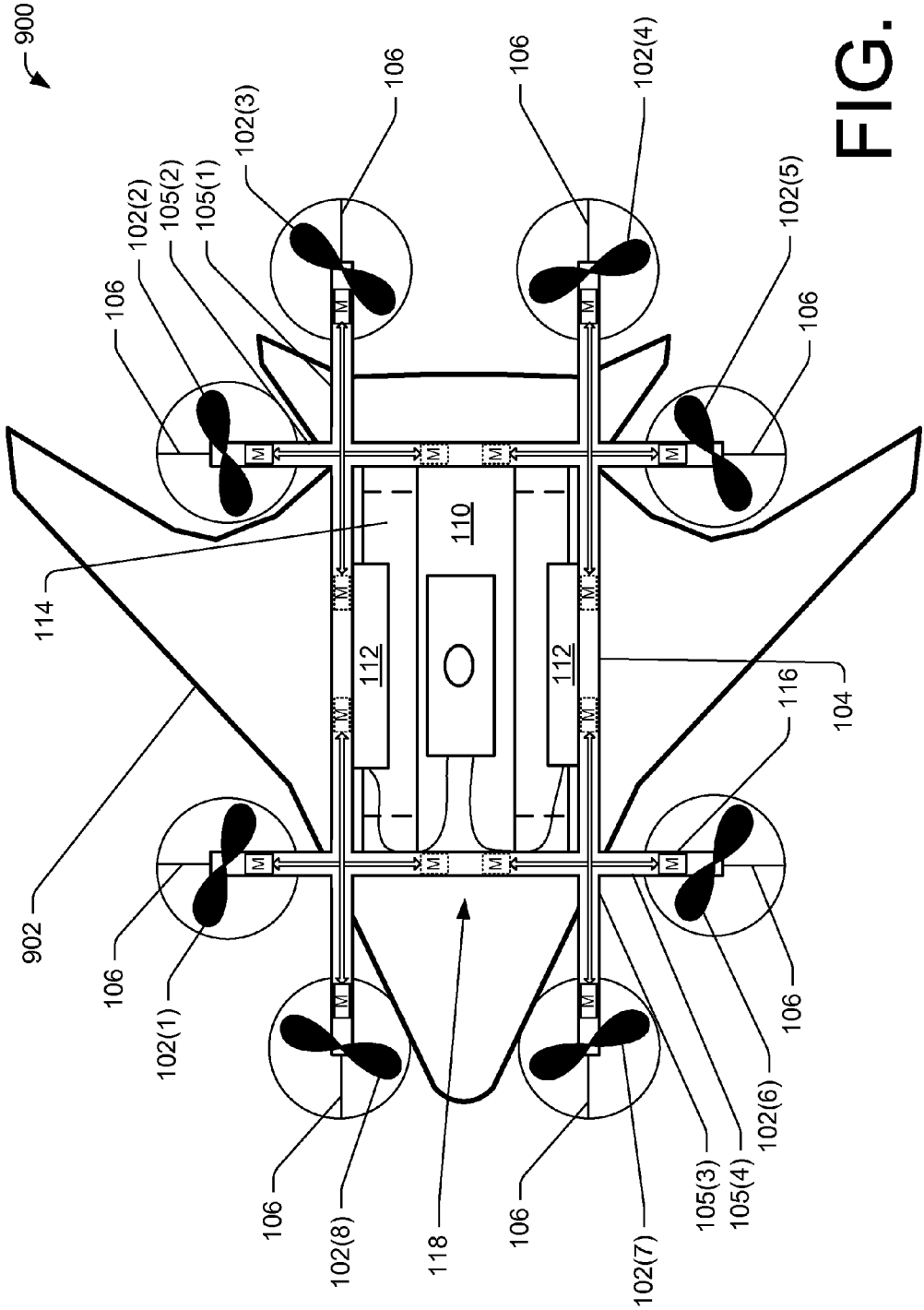
FIG. 9 is a top view of an illustrative automated aerial vehicle (AAV) that includes at least one fixed wing and movable ballast usable to modify flight and maneuverability characteristics of the AAV.

FIG. 9 is a top view of an illustrative AAV 900 that includes at least one fixed wing 902 and movable ballast usable to modify flight and maneuverability characteristics of the AAV. Unlike the AAV 100, the AAV 900 may sustain fixed wing flight while the fixed wing 902 (or multiple fixed wings) provide upward lift during flight. In some embodiments, at least some of the propellers 102 may tilt to enable causing forward propulsion by pulling and/or pushing the AAV 900, depending on the rotation direction of each of the propellers 102. The AAV 900 may include any combination of the movable ballast discussed herein.

Figure 10:
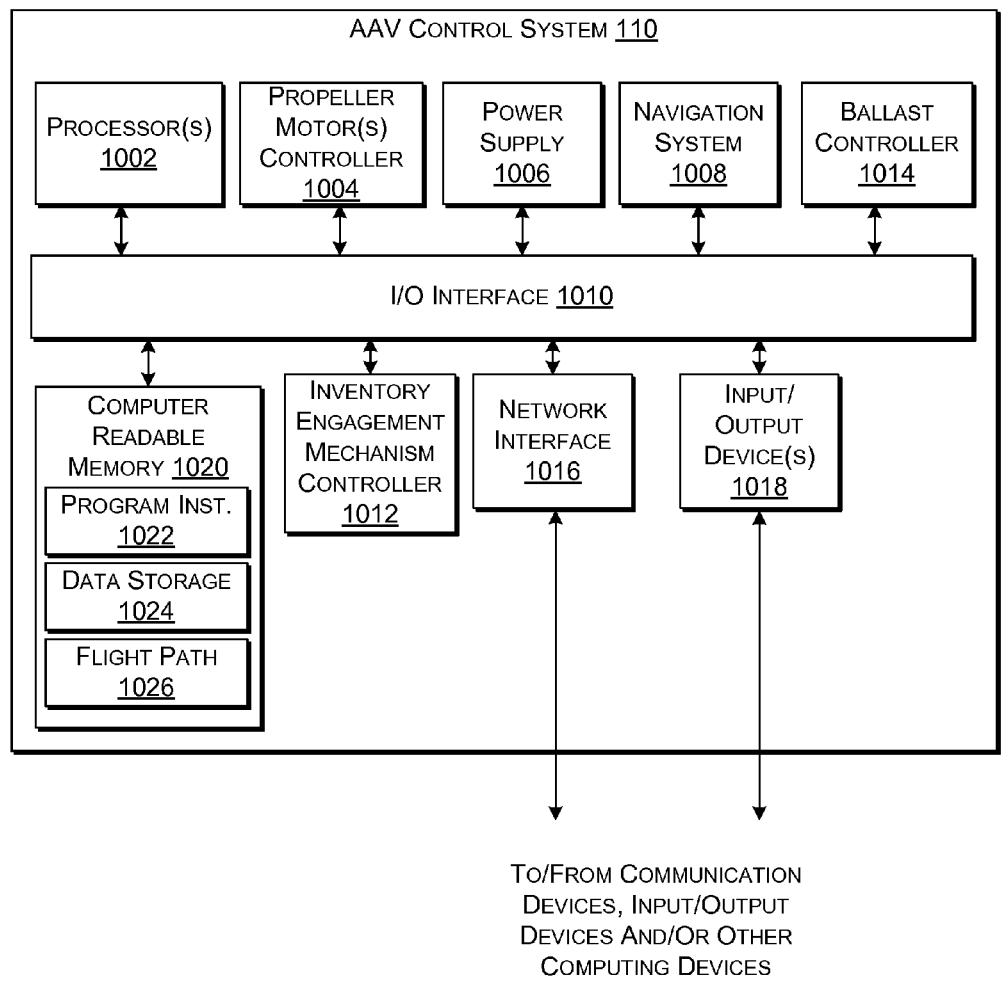
FIG. 10 is a block diagram of an illustrative computing architecture of the AAV.

FIG. 10 is a block diagram of an illustrative computing architecture of the AAV 100, 900. In various examples, the block diagram may be illustrative of one or more aspects of the AAV control system 110 that may be used to implement the various systems, devices, and techniques discussed above. In the illustrated implementation, the AAV control system 110 includes one or more processors 1002, coupled to a non-transitory computer readable storage medium 1020 via an input/output (I/O) interface 1010. The AAV control system 110 may also include a propeller motor controller 1004, power supply module 1006 and/or a navigation system 1008. The AAV control system 110 further includes an inventory engagement mechanism controller 1012, a ballast controller 1014, a network interface 1016, and one or more input/output devices 1018.

In various implementations, the AAV control system 110 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, flight paths and/or data items accessible by the processor(s) 1002. In various implementations, the non-transitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1020 as program instructions 1022, data storage 1024 and flight path data 1026, respectively. In other implementations, program instructions, data and/or flight paths may be received, sent or stored upon different types of computer-accessible media, such as non-transitory media, or on similar media separate from the non-transitory computer readable storage medium 1020 or the AAV control system 110. Generally speaking, a non-transitory, computer readable storage medium may include storage media or memory media such as flash memory (e.g., solid state memory), magnetic or optical media (e.g., disk) coupled to the AAV control system 110 via the I/O interface 1010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface or other peripheral interfaces, such as input/output devices 1018. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The propeller motor(s) controller 1004 communicates with the navigation system 1008 and adjusts the power of each propeller motor to guide the AAV along a determined flight path. The power supply module 1006 may control the charging and any switching functions associated with one or more power modules (e.g., batteries) of the AAV, such as the power sources 614, 714.

The navigation system 1008 may include a GPS or other similar system that can be used to navigate the AAV to and/or from a location. The inventory engagement mechanism controller 1012 communicates with the actuator(s) or motor(s) (e.g., a servo motor) used to engage and/or disengage inventory. For example, when the AAV is positioned over a level surface at a delivery location, the inventory engagement mechanism controller 1012 may provide an instruction to a motor that controls the inventory engagement mechanism to release the inventory.

The ballast controller 1014 may operate to cause movement of the ballast as discussed herein. For example, the ballast controller 1014 may cause activation of a wheel, deactivation of the wheel, opening/closing of switches, changes in pressure, and so forth. Thus, the ballast controller 1014 may cause movement of the ballast between a first position, a second position, and possibly intermediary position(s).

The network interface 1016 may be configured to allow data to be exchanged between the AAV control system 110, other devices attached to a network, such as other computer systems, and/or with AAV control systems of other AAVs. For example, the network interface 1016 may enable wireless communication between numerous AAVs. In various implementations, the network interface 1016 may support communication via wireless general data networks, such as a Wi-Fi network. For example, the network interface 1016 may support communication via telecommunications networks such as cellular communication networks, satellite networks, and the like.

Input/output devices 1018 may, in some implementations, include one or more displays, image capture devices, thermal sensors, infrared sensors, time of flight sensors, accelerometers, pressure sensors, weather sensors, airflow sensors, etc. Multiple input/output devices 1018 may be present and controlled by the AAV control system 110. One or more of these sensors may be utilized to assist in landings as well as avoiding obstacles during flight.

As shown in FIG. 10, the memory may include program instructions 1022 which may be configured to implement the example processes and/or sub-processes described above. The data storage 1024 may include various data stores for maintaining data items that may be provided for determining flight paths, retrieving inventory, landing, identifying a level surface for disengaging inventory, causing movement of ballast, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AAV control system 110 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AAV control system 110 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AAV control system 110. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the AAV control system 110 may be transmitted to the AAV control system 110 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AAV control system configurations.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An automated aerial vehicle (AAV) comprising:
   a frame comprising one or more structures that substantially span a width and a length of the AAV;
   a plurality of propeller motors coupled to the frame, each propeller motor to rotate at least one propeller to cause lift and propulsion of the AAV;
   a ballast motor to rotate a wheel;
   a ballast included within at least one structure of the one or more structures, the ballast being configured to traverse between a first position located proximate to a center of mass of the AAV and second position located away from the center of mass, a traverse of the ballast caused in response to activation of the ballast motor that rotates the wheel, the wheel engaging the ballast to cause the traverse of the ballast, wherein the ballast located in the first position causes a first polar moment of inertia resulting in more agile control of the AAV while the ballast located in the second position causes a second polar moment of inertia resulting in more stable control of the AAV;
   a power source to provide power to the propeller motors and ballast motor; and
   a control system in communication with at least the propeller motors, the ballast motor, and the power source, the control system to control at least operation of the propellers and the traverse of the ballast.

2. The AAV as recited in claim 1, wherein the wheel is a spindle that is coupled to a first end of a cable, a second end of the cable coupled to the ballast, the spindle, when rotated in a first rotational direction by the ballast motor, causing the ballast to traverse toward the first position proximate to the center of mass of the AAV.

3. The AAV as recited in claim 1, wherein the wheel is a pinion that engages teeth of a rack that is coupled to the ballast, the pinion, when rotated in a first rotational direction by the ballast motor, causing the ballast to traverse toward the first position proximate to the center of mass of the AAV.

4. The AAV as recited in claim 1, wherein the at least one structure includes a first arm and a second arm coupled substantially perpendicularly to the first arm, and wherein the ballast includes a first ballast that traverses along the first arm and a second ballast that traverses along the second arm, the traverse of the first ballast and the traverse of the second ballast being caused by rotation of the wheel.

5. A frame of an aerial vehicle, the frame comprising:
   a plurality of propeller motors coupled to the frame, each propeller motor to rotate at least one propeller to cause lift of the aerial vehicle;
   a support structure that includes:
      ballast configured for movement relative to the support structure, and
      a guide to enable movement of the ballast relative to the support structure; and
   a ballast controller to cause the ballast to traverse between a first position relative to the support structure and a second position relative to the support structure during flight of the aerial vehicle.

6. The frame as recited in claim 5, further comprising a ballast motor coupled to a spindle, wherein the support structure further includes a cable that couples the ballast to the spindle, and wherein rotation of the spindle causes the ballast to traverse along the guide.

7. The frame as recited in claim 5, further comprising a ballast motor coupled to a pinion, wherein the support structure further includes a rack coupled to the ballast, and wherein rotation of the pinion causes movement of the rack that causes the ballast to traverse along the guide.

8. The frame as recited in claim 5, further comprising:
   a power source;
   plurality of electromagnets powered by the power source, each electromagnet including a switch controlled by the ballast controller to power a respective electromagnet, and
   wherein the ballast is ferromagnetic, and wherein the traverse is caused in response to opening and closing of switches associated with the plurality of electromagnets.

9. The frame as recited in claim 8, wherein the ballast is oblong, wherein the guide includes teeth, and wherein at least one of the plurality of electromagnets is configured to cause the ballast to rotate to engage the teeth to secure the ballast in a position within the support structure.

10. The frame as recited in claim 5, wherein the guide is an interior of a pressure vessel that contains the ballast, the pressure vessel having an input, the input having a pressure, and wherein the traverse is caused in response to a change in the pressure at the input of the pressure vessel.

11. The frame as recited in claim 5, wherein the support structure includes a first arm and a second arm coupled substantially perpendicularly to the first arm, and wherein the ballast includes a first ballast that traverses along the first arm and a second ballast that traverses along the second arm.

12. The frame as recited in claim 11, wherein the first ballast and the second ballast are moveably coupled to one another such that the first ballast traverses toward a center of mass of the aerial vehicle while the second ballast also traverses toward the center of mass of the aerial vehicle.

13. The frame as recited in claim 11, wherein the first ballast and the second ballast are moveably coupled to one another such that the first ballast traverses toward a center of mass of the aerial vehicle while the second ballast traverses away from the center of mass of the aerial vehicle.

14. The frame as recited in claim 5, wherein the support structure further includes a biasing device having a first end coupled to the ballast and a second end coupled to the support structure, the biasing device to impose a force on the ballast to cause the ballast to be positioned at the first position relative to the support structure absent an opposite, greater force imposed on the ballast that causes the ballast to be positioned at the second position relative to the support structure.

15. An aerial vehicle comprising:
   a plurality of propeller motors coupled to a frame, each propeller motor to rotate at least one propeller to cause lift of the aerial vehicle;
   the frame comprising one or more structures that at least partially span a width and a length of the aerial vehicle;
   ballast included in at least one structure of the one or more structures, the ballast being configured to traverse between a first position located proximate to a center of mass of the aerial vehicle and second position located away from the center of mass, wherein the traverse of the ballast adjusts a polar moment of inertia of the aerial vehicle; and
   a ballast controller to control operation of the traverse of the ballast between the first position and the second position during flight of the aerial vehicle.

16. The aerial vehicle as recited in claim 15, further comprising a ballast motor, and wherein the traverse is caused in response to activation of the ballast motor that rotates a wheel, the wheel engaging the ballast to cause the traverse of the ballast.

17. The aerial vehicle as recited in claim 15, further comprising:
   a plurality of electromagnets coupled to a power source, each electromagnet including a switch controlled by the ballast controller to provide power to a respective electromagnet, and
   wherein the ballast is ferromagnetic, and wherein the traverse is caused in response to opening and closing of switches associated with the plurality of electromagnets.

18. The aerial vehicle as recited in claim 15, wherein the ballast is confined in a pressure vessel the pressure vessel having an input, the input having a pressure and wherein the traverse is caused in response to a change in the pressure at the input of the pressure vessel.

19. The aerial vehicle as recited in claim 15, wherein the at least one structure includes one or more locking mechanisms to at least temporarily secure the ballast in the first position, the second position or an intermediate position between the first position and the second position.

20. The aerial vehicle as recited in claim 15, wherein the at least one structure is a tube having a cavity that guides movement of the ballast as the ballast traverses between the first position and the second position.

* * * * *